United States Patent [19]
Laing et al.

[11] B 3,920,953
[45] Nov. 18, 1975

[54] BUILDING PLATES WITH CONTROLLABLE HEAT INSULATION

[76] Inventors: Nikolaus Laing; Ingeborg Laing, both of Hofener Weg 35-37, 7141 Aldingen bei Stuttgart, Germany

[22] Filed: Feb. 26, 1973

[21] Appl. No.: 335,773

[44] Published under the Trial Voluntary Protest Program on January 28, 1975 as document no. B 335,773.

Related U.S. Application Data

[62] Division of Ser. No. 830,457, June 4, 1969, Pat. No. 3,720,198.

[30] Foreign Application Priority Data

Feb. 3, 1969 Austria .............................. 1072/69
Feb. 3, 1969 Austria .............................. 1068/69

[52] U.S. Cl. ................. 219/378; 165/96; 219/213; 219/341; 219/462
[51] Int. Cl.² .......................................... F24H 7/00
[58] Field of Search ........ 165/96, 32; 219/378, 365, 219/462, 341, 213, 528; 126/400

[56] References Cited
UNITED STATES PATENTS

| | | | |
|---|---|---|---|
| 2,010,180 | 3/1932 | Ferranti | 219/378 |
| 3,244,224 | 4/1966 | Hnilicka | 165/32 |
| 3,281,578 | 10/1966 | Chapman | 219/528 |
| 3,411,156 | 3/1965 | Feher | 165/96 X |
| 3,463,224 | 8/1969 | Myers | 165/96 X |
| 3,546,432 | 12/1970 | Eisler | 219/213 X |

*Primary Examiner*—J. V. Truhe
*Assistant Examiner*—Clifford C. Shaw
*Attorney, Agent, or Firm*—Pennie & Edmonds

[57] ABSTRACT

Building plate with controllable heat insulation means comprising two walls which may be moved relatively towards or away from each other by inflatable ducts between the walls to control transfer of heat therebetween when the walls face zones of different temperatures.

5 Claims, 1 Drawing Figure

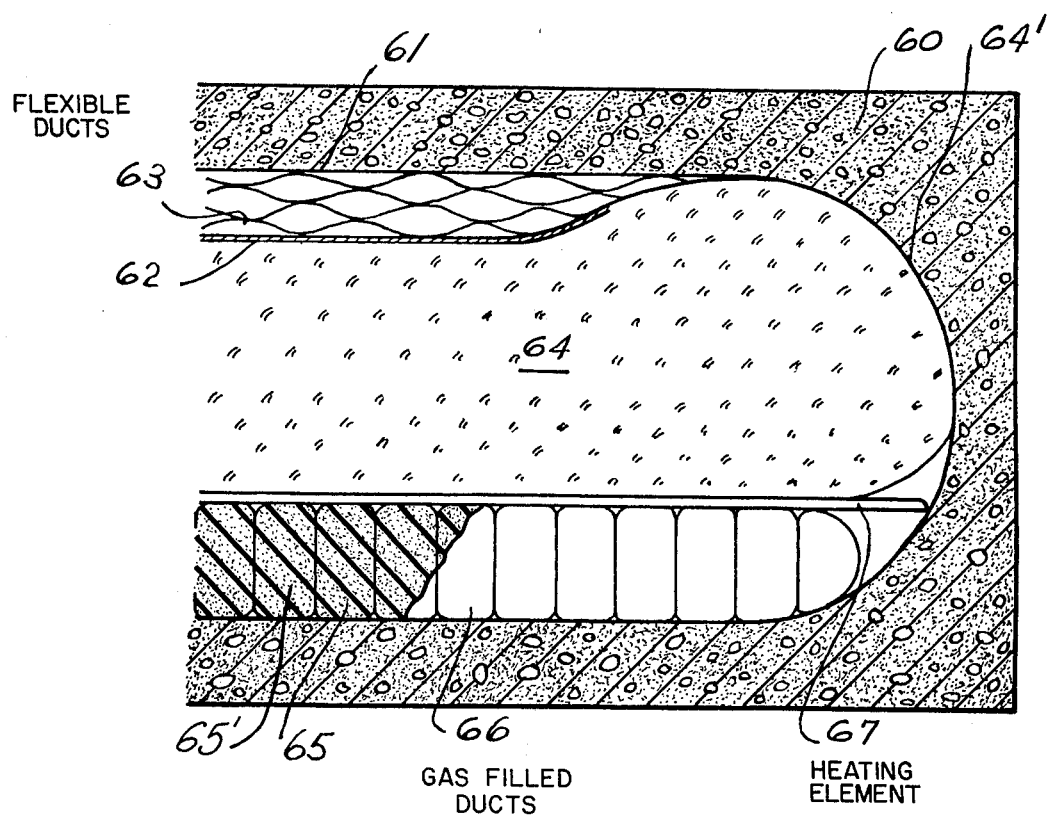

3,920,953

BUILDING PLATES WITH CONTROLLABLE HEAT INSULATION

REFERENCE TO OTHER APPLICATIONS

This application is a division of our copending application Ser. No. 830,457 filed June 4, 1969, now U.S. Pat. No. 3,720,198.

BACKGROUND OF THE INVENTION

The invention relates generally to a building plate which is designed for use as an insulation panel and which includes means for varying the insulation properties of the plate. The construction industry requires for the most part insulation plates having high insulation properties and desirably, plates which may also have structural properties in order to be more easily included in building structures, as for example wall structures, ceiling structures or floor structures. In the past plates having good insulation properties, i.e., equal to that of thick brick walls, have usually been of massive construction and consequently expensive. Further, such plates have lacked means to effectively vary the insulation properties which is a desirable feature during different parts of the day. For example, during the summer, it is desirable to have an insulation plate having good insulation properties during the daytime in order to prevent outdoor heat entering into a room. However, during the night when the temperature outdoors may drop below the temperature inside a room, it may then be desirable to have a plate having low insulation properties in order to allow the transfer of heat from the interior of a room to the outdoors. At other times, as during the winter, it may be desirable to have the plate absorb solar heat and to transfer the same to the interior of a room.

In addition, in some instances it may be desirable to utilize a heat storage element with the plate along with a heating means whereby the heating means may charge the heat storage element during off-peak hours and whereby the heat in the element may be controllably released to the interior of a room by utilizing the variable insulation properties of the plate.

GENERAL SUMMARY OF THE INVENTION

Broadly, we provide for a building panel in the form of a building plate which has a controllable insulation means. The controllable insulation means comprises a first wall which may face a zone of one temperature and a second movable wall which may face a zone of a different temperature. Means are provided for moving the second wall towards and away from the first wall to vary the transfer of heat therebetween such that when the walls are close together or contacting each other, the insulation properties of the plate will be at its minimum and whereby when the walls are separated, the insulation properties of the plate will be at its maximum. The walls are moved apart by means of inflatable ducts which are adapted to be inflated by air or a gas. The ducts when inflated in themselves provide an insulation means between the walls. In addition a heat storage element may be bounded by the movable wall such that transfer of heat between the heat storage element and the fixed wall may be easily controlled. Where the plate is to be used as a heating means to heat the interior of a room, a heating means may be provided to contact the heat storage element. Resilient means are provided for urging the heat storage element into close contact with the movable walls.

DESCRIPTION OF THE DRAWINGS

The drawing is a cross-sectional view of a building plate constructed according to the invention.

DETAILED DESCRIPTION OF THE PREFERRED EMBODIMENT

Referring to the FIGURE, a building plate 60 in the form of a panel is illustrated adapted for use as a floor forming structural panel. The plate 60 has a fixed wall 61 which is adapted to face a first zone of a particular temperature, that zone being the space in a room above a floor when a plate is used as a floor panel. A movable wall 62 is included in the panel and is adapted to move towards and away from the fixed wall 61. Flexible ducts 63 are positioned between walls 61 and 62 and provide the means for moving the second movable wall towards and away from the first movable wall 61. Ducts 63 in turn are formed of foil, films or flexible sheets which are welded together longitudinally. The wall 62 is adapted to face a second zone of a different temperature than that of the first zone. In the embodiment shown, wall 62 faces a zone of temperature determined by a heat storage element 64 which is bounded in part by the movable wall.

When the flexible ducts 63 are inflated by air or other gas, the wall 62 is moved away from the fixed wall thus decreasing transfer of heat between the walls and increasing the insulation properties of the plate. When the ducts are inflated, the air or gas used also imparts additional insulation minimizing heat flow between the two walls. When the ducts are deflated, the wall 62 moves towards the fixed wall such that the walls will be separated only by the material of the ducts, and the insulation due to the air or gas in the ducts will be minimized thus reducing the insulation properties of the plate.

Preferably the heat storage element 64 which may be utilized with the plate comprises a heat storage element comprising a substance having high latent heat properties contained in a flexible tube 64'. Thus any heat that may be stored in the substance may be transferred to the fixed wall, and thus to the interior of a room when the ducts are deflated. The storage element is urged towards the movable wall by resilient means 65 which may comprise foam rubber filled ducts 65' or gas filled ducts 66 both of which may also act as an insulation material.

In addition a heater means 67 may be positioned between the storage element and the resilient means when the plate is also to be used as a heating means to heat the interior of a room. The heating means, which may comprise an electrical heater, is energized to charge the heat storage element during low tariff hours, for example during the night, when the demand for electricity is low, such as to release its heat during the day. In this event the ducts 63 would be inflated during the time that the heat storage element is being charged and deflated during the day when it is desired to transfer heat from the element to the interior of a room.

The plate shown may also be used to condition the temperature of a room to cool it during the day and to heat it during the night. In this instance the duct 63 would be deflated during the day allowing transfer of heat from the fixed wall to the heat storage element. During the night the ducts would be inflated whereby heat would be transferred from the heat storage element to the exterior of a room through the lower portion of the plate.

Preferably the ducts 63 are made sufficiently small in order that the Grasshof numbers will be below the number required to support a convection flow of gasses within the individual ducts. This further increases the insulation properties of the panel when the ducts are inflated.

While we have shown the plate adapted for use as a floor panel, it is apparent that the plate could be used also as a wall panel or ceiling panel. Further the plate could be utilized without a storage element or heater means to effectively control transfer of heat between two zones of different temperatures.

What is claimed is:

1. Building plate with controllable heat insulation means comprising a first wall adapted to face a zone of a first temperature, a second movable wall opposite said first wall and adapted to face a zone of a second temperature, a heat storage element comprising a latent heat storage substance bounding said second wall on its side facing the zone of second temperature, wall moving means for moving said second wall towards and away from said first wall to vary the transfer of heat between the walls, and resiliant means for urging said heat storage element towards said second wall.

2. Building plate according to claim 1 having in addition heater means for heating said substance with said heating means being positioned between said heat storage element and said resiliant means.

3. Building plate according to claim 1 wherein said resilient means comprises a foam rubber material.

4. Building plate according to claim 1 wherein said resilient means comprises gas filled ducts.

5. Building plate with controllable heat insulation means comprising a first wall adapted to face a zone of a first temperature, a second movable wall opposite said first wall and adapted to face a zone of a second temperature, a heat storage element comprising a latent heat storage substance bounding said second wall on its side facing the zone of second temperature, flexible ducts extending between said first and second walls, and means for filling said ducts with a gas whereby the ducts may expand to move said second wall away from said first wall to increase the heat insulation properties of said plate and to exhaust said gas from said ducts to allow said ducts to deflate and so allow said second wall to move towards said first wall to decrease the heat insulation properties of the plate.

* * * * *